(12) United States Patent
Harris, Jr.

(10) Patent No.: US 12,566,887 B2
(45) Date of Patent: Mar. 3, 2026

(54) MULTI-TIERED DATA SECURITY AND AUDITING SYSTEM

(71) Applicant: Capital One Services, LLC, McLean, VA (US)

(72) Inventor: James E. Harris, Jr., McLean, VA (US)

(73) Assignee: Capital One Services, LLC, McLean, VA (US)

( * ) Notice: Subject to any disclaimer, the term of this patent is extended or adjusted under 35 U.S.C. 154(b) by 43 days.

(21) Appl. No.: 18/638,905

(22) Filed: Apr. 18, 2024

(65) Prior Publication Data

US 2025/0328678 A1    Oct. 23, 2025

(51) Int. Cl.
*G06F 21/62*     (2013.01)
*H04L 9/08*      (2006.01)

(52) U.S. Cl.
CPC ........ *G06F 21/6245* (2013.01); *H04L 9/0869* (2013.01); *G06F 2221/2141* (2013.01)

(58) Field of Classification Search
CPC ....... H04L 9/08; H04L 9/0861; H04L 9/0869; G06F 21/60; G06F 21/62; G06F 21/6218; G06F 21/6245; G06F 2221/21; G06F 2221/2141
See application file for complete search history.

(56) References Cited

U.S. PATENT DOCUMENTS

| | | | |
|---|---|---|---|
| 8,381,287 B2 | 2/2013 | Trotter | |
| 8,468,244 B2 | 6/2013 | Redlich et al. | |
| 9,292,707 B1 * | 3/2016 | Fontecchio | ........... H04L 9/0825 |
| 10,956,591 B1 * | 3/2021 | Joshi | ..................... G06F 21/602 |
| 2012/0303558 A1 | 11/2012 | Jaiswal | |
| 2014/0032417 A1 | 1/2014 | Mattsson | |
| 2017/0214521 A1 * | 7/2017 | Busch | ................... H04L 9/0618 |
| 2019/0342088 A1 * | 11/2019 | Eidson | ...................... H04L 9/14 |
| 2020/0327252 A1 * | 10/2020 | Mcfall | .................... G06F 21/78 |

FOREIGN PATENT DOCUMENTS

AU      2013-308905 B2   12/2018

* cited by examiner

*Primary Examiner* — D'Arcy Winston Straub
(74) *Attorney, Agent, or Firm* — Banner & Witcoff, Ltd.

(57)     ABSTRACT

Methods and systems disclosed herein describe tokenizing potentially sensitive data fields and distributing the tokenized data across various enclaves associated with multi-tiered security levels. A user may request to unmask the tokenized data. By auditing the tokenized data and the various enclaves, an authorized user may determine that the tokenized data has been properly classified or improperly misclassified. After confirming the classification of the tokenized data, the data may be decoded and provided in plaintext in its appropriate enclave or permanently deleted from all corresponding enclaves.

20 Claims, 9 Drawing Sheets

300

Control Processing
Server System

130

100

140

Network

Control Processing
Device

110

120

Database System

300

400

600

702 Streaming Data

{"name": "John Doe",
"cust_number": "1234-5678-
9"}

704 General Database

{"name": "John Doe",
"cust_number":
"1eebc3f830e4da4faedfc6"}

706
1eebc3f830e4da4faedfc6

710
8b126acd75fb8b71f243e8d00a6565cdea99534286a7

708 Sensitive Enclave

{"419f6f3a1cf23805118e40483cc8be4
ad44077332519c4be30726c34fde993
38":
"8b126acd75fb8b71f243e8d00a6565c
dea99534286a7"}

714
8b126acd75fb8b71f243e8d00a6565cdea99534286a7

712 Confidential Enclave

{"0ed34e814c158c3d98161f1d32df23ac
3eedf2bec28f933d5282f2a33fd16df1":
"8b126acd75fb8b71f243e8d00a6565cde
a99534286a7"}

MULTI-TIERED DATA SECURITY AND AUDITING SYSTEM

FIELD OF USE

Aspects of the disclosure relate generally to securing data and more specifically to enhancing the tokenization of data and auditing the tokenized data.

BACKGROUND

Data security involves the protection of digital information from unauthorized access, corruption, destruction, modification, theft, or disclosure. Various processes of securing data are used in the industry. For example, tokenization is the process of replacing sensitive data with unique identification symbols that retain all the essential information about the data without compromising its security. Tokenizing sensitive data elements, such as users' credit card information or e-commerce transactions, can be used in the context of securing users' sensitive data safely into the cloud. Some tokenization systems are single-tiered, while others merely hash the data and store the hash value in questioned fields. However, these systems can be vulnerable to attacks. For example, these systems may be attacked by rainbow tables to easily recover the data fields, especially for well-known data field patterns such as social security numbers or credit card numbers. Other systems may rely heavily on encryption to secure and protect the data at higher tiers. However, these may be susceptible to cyberattacks or malicious activity that seek to gain unauthorized access to sensitive data when the higher-level enclave is compromised. Accordingly, there is a need for bolstering the security of sensitive data in various enclaves against attacks.

Aspects described herein may address these and other problems, and generally improve the quality and efficiency of securing sensitive data.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein may allow for enhanced data security through the tokenization of data in multi-tiered security enclaves and by auditing the tokenized data to make available to authorized users, reclassify data or permanently delete and redact sensitive data that should not have been recorded. This may have the effect of bolstering the security of sensitive data over traditional tokenization and data encryption processes, which may be susceptible to cyberattacks or other malicious activity that seek to gain unauthorized access to sensitive data.

According to some aspects, these and other benefits may be achieved by identifying sensitive data fields or detecting data patterns indicating potentially sensitive data in a database. The system may generate a random number array for the detected sensitive data field and produce a hash to distribute across multi-tiered security enclaves. Hash values may be used as indices for managing, searching and locating the associated tokenized data in the database. Hash functions in database management systems may increase performance by mapping the keys to the table size. A hash value may then become the index for a specific element such as the tokenized data. In some instances, other types of indexing, such as customer identifiers, may be used additionally or alternatively to a hash value. In implementation, lower-security level enclaves may be queried for any potentially sensitive data fields that are present. In some instances, the data may be confirmed to be sensitive data that has been properly retained and properly classified in the appropriate security enclaves. This data may only be available to authorized users (e.g., auditor or admin) who have access to the appropriate security enclaves. The system may hash the random number stored in the field and search the higher-tiered security enclaves for the corresponding random number arrays. This process may be repeated upwards for the random number arrays stored in higher-tiered security enclaves. Once all of the random number arrays have been collected by an auditor or admin with the appropriate permissions, the system may XOR all of the random number arrays together to display the original data in plaintext.

Additionally, or alternatively, an analyst may suspect that the sensitive data field is misclassified, but may not have the authority to access the higher security enclave (e.g., higher-tiered security enclave). The analyst may request a review (e.g., audit) by an authorized user (e.g., admin, auditor) with the appropriate access. Misclassified data may be data that was properly retained, but over-classified. Additionally, or alternatively, misclassified data may be data that was improperly retained, but properly classified.

In some instances, the data may be confirmed to be properly retained, but over-classified. The data may be confirmed to be properly retained because the data is, in fact, sensitive data and there may not be any policy that prohibits the storage or retention of the data. However, the data may have been improperly classified into a higher security enclave. The data should have been classified into a lower security enclave (e.g., lower-tiered security enclave). In this case, an authorized user (e.g., admin, auditor) may update (e.g., overwrite) the original record with plain text such that the data may be viewed as plain text. Additionally, or alternatively, the authorized user or the system, may lift the restrictions on tokenized data at the higher security enclave, such that the lower-level database software can automatically read and unmask the data.

In some instances, the data may be confirmed to be improperly retained, but properly classified. An authorized user may have determined that the data is sensitive data, but the data may have been retained when it should not have been retained. The data may be improperly retained for various reasons. For example, there may be a policy that prohibits the storage or retention of the data. In yet another example, the retention period for the data may have expired. In yet another example, a European citizen may have invoked their "right to be forgotten" regarding their sensitive data. The authorized user may mitigate this improper classification by permanently deleting the data from the high security enclave, resulting in sensitive data that is redacted and unrecoverable. Additionally, or alternatively, after unmasking, the authorized user may determine that the data is sensitive data, but was improperly classified. Nevertheless, the data may have been retained when it should not have been retained. The authorized user may mitigate this improper classification by permanently deleting the data from the high security enclave, resulting in sensitive data that is redacted and unrecoverable.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
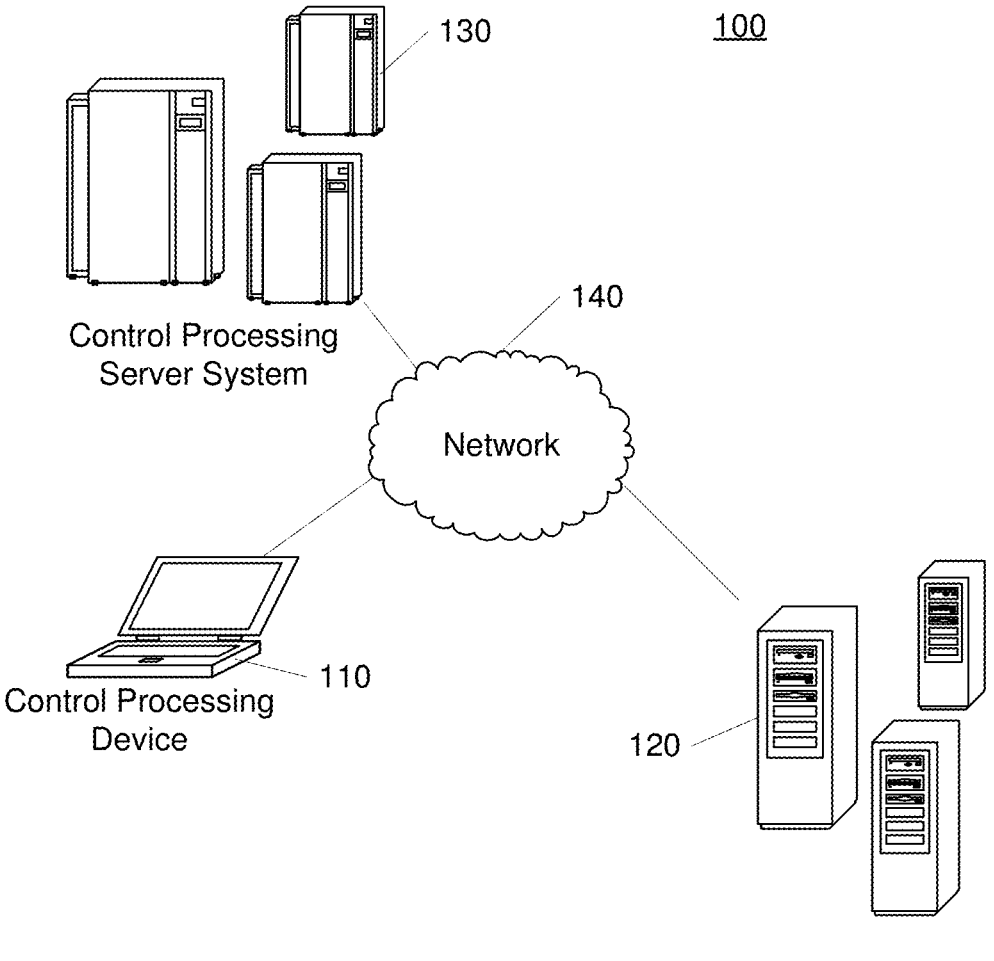
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for securing, tokenizing, encrypting, or masking, potentially sensitive data fields in a database by distributing individually-irreversible tokens (IIT) or random number arrays across two or more different security enclaves. Examples of potentially sensitive data fields may be payment card information, social security numbers, or other sensitive data that may have been inadvertently recorded in a database. An automated user, who has authority to access the various security enclaves, may determine that the sensitive data was properly tokenized or improperly classified. For example, the automated user may be a special auditor or may have an admin role. If the sensitive data was properly tokenized, then the automated user may make the sensitive data available to authorized users. If the sensitive data was improperly classified, wherein the sensitive data should not have been recorded at all due to the end or revocation of the data retention period, then the automated user may permanently delete and redact the sensitive data. This represents an improvement over traditional data security processes involving tokenization and data encryption, which may be susceptible to cyberattacks or other malicious activity that seek to gain unauthorized access to sensitive data. The risk of sensitive data loss is significant and can have serious consequences for both individuals and organizations. For example, sensitive data such as personal and financial information can be used to steal an individual's identity, allowing hackers to access bank accounts, open credit accounts, and make fraudulent purchases.

Systems and methods as described herein may allow for enhanced data security through the tokenization of data in multi-tiered security enclaves and by auditing the tokenized data to make available to authorized users or permanently delete the sensitive data. This may have the effect of bolstering the security of sensitive data over traditional tokenization and data encryption processes, which may be more susceptible to cyberattacks or other malicious activity that seek to gain unauthorized access to sensitive data.

According to some aspects, these and other benefits may be achieved by identifying sensitive data fields or detecting data patterns indicating potentially sensitive data from a database. The system may tokenize the data by generating a random number array for the detected sensitive data field and produce a hash of that data field to distribute across multi-tiered security enclaves. In implementation, lower-security level enclaves may be queried for any potentially sensitive data fields that are present. When an auditor or admin suspects that the sensitive data field is improperly classified, but does not have access to the higher-tiered security enclave, the auditor or admin may request a review by an auditor with the appropriate access. When an auditor or admin with authority to access the necessary enclave queries the record, the system hashes the random number stored in the field and searches the higher enclaves for the corresponding random number array. This process may be repeated upwards for the random number arrays stored in higher tiered security enclaves. Once all of the random number arrays have been collected by an auditor or admin with the appropriate permissions, the system may have the ability to decode the tokenized data and provide the original sensitive data in plaintext. The system may do so by executing a variety of different computations, operations, comparative analyses, algorithms, etc. For example, the system may execute a bitwise exclusive-or (XOR) operation on all of the random number arrays from each of the enclaves together to display the original data in plaintext. Additionally, or alternatively, the system may execute bitwise XNOR operations on all of the random number arrays from each of the enclaves together to display the original data in plain text. There may be additional, alternative, or a combination of the basic logic operations to accomplish the task of displaying the original in plain text.

The process of decoding, decrypting, or unmasking can be performed in a variety of ways. In some instances, the decoding process may be portrayed in the context of an exemplary sensitive data called the third data, associated with a third security level. The third data may be tokenized and stored as a second random number array in the first security enclave, a third random number array in the second security enclave, and a third array in a third security enclave. The third array may be a second cryptographic array associated with the second random number array and the third random number array. The second cryptographic array may have been generated as a result of a variety of computations. For example, the system may have used a comparative algorithm, a combinatorial algorithm, a binary operation, a bit-wise exclusive-or operation, etc. By executing a bit-wise exclusive-or operation between the second random number array and the third random number array, the third array may be generated as a second cryptographic array. In order to decode the third data, the system may generate a fourth array by performing a comparative operation between the third random number array with the third array. This comparison may be the same operation that was previously used to generate the third array. The system may further perform a comparative operation between the second random number array with the fourth array. This operation should provide a result that matches the plaintext of the sensitive data.

By using the hash values associated with the respective arrays at each enclave, the system may locate the plaintext of the sensitive data in a database (e.g., look-up table) to unmask the sensitive data as plaintext. The admin must have the authority to access each of the enclaves in order to successfully decode and unmask the sensitive data. Without access to all of the enclaves, an attacker or user without authorization, may not be able to make sense of the various random number arrays.

In implementation, lower-security level enclaves may be queried for any potentially sensitive data fields that are present. In some instances, the data may be confirmed to be sensitive data that has been properly retained and properly classified in the appropriate security enclaves. This data may only be available to authorized users (e.g., auditor or admin) who have access to the appropriate security enclaves. The system may hash the random number stored in the field and search the higher-tiered security enclaves for the corresponding random number arrays. This process may be repeated upwards for the random number arrays stored in higher-tiered security enclaves. Once all of the random number arrays have been collected by an auditor or admin with the appropriate permissions, the system may XOR all of the random number arrays together to display the original data in plaintext.

Additionally, or alternatively, an analyst may suspect that the sensitive data field is misclassified, but may not have the authority to access the higher security enclave. The analyst may request a review (e.g., audit) by an authorized user (e.g., admin, auditor) with the appropriate access. Misclassified data may be data that was properly retained, but over-classified. Additionally, or alternatively, misclassified data may be data that was improperly retained, but properly classified.

In some instances, the data may be confirmed to be properly retained, but over-classified. The data may be confirmed to be properly retained because the data is, in fact, sensitive data and there may not be any policy that prohibits the storage or retention of the data. However, the data may have been improperly classified into a higher security enclave. The data should have been classified into a lower security enclave. In this case, an authorized user (e.g., admin, auditor) may update (e.g., overwrite) the original record with plain text such that the data may be viewed as plain text. Additionally, or alternatively, the authorized user or the system, may lift the restrictions on tokenized data at the higher security enclave, such that the lower-level database software can automatically read and unmask the data.

In some instances, the data may be confirmed to be improperly retained, but properly classified. An authorized user may have determined that the data is sensitive data, but the data may have been retained when it should not have been retained. The data may be improperly retained for various reasons. For example, there may be a policy that prohibits the storage or retention of the data. In yet another example, the retention period for the data may have expired. In yet another example, a European citizen may have invoked their "right to be forgotten" regarding their sensitive data. The authorized user may mitigate this improper classification by permanently deleting the data from the high security enclave, resulting in sensitive data that is redacted and unrecoverable. Additionally, or alternatively, after unmasking, the authorized user may determine that the data is sensitive data, but was improperly classified. Nevertheless, the data may have been retained when it should not have been retained. The authorized user may mitigate this improper classification by permanently deleting the data from the high security enclave, resulting in sensitive data that is redacted and unrecoverable.

FIG. 1 shows a system 100. The system 100 may include at least one device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Devices 110 may perform client-side actions and represent, be incorporated in, and/or include various devices such a desktop computer, a computer server, a mobile device (e.g., a laptop computer, a tablet computer, a smart phone, any other types of mobile computing devices, and the like), and/or any other type of data processing device as described herein.

Database systems 120 may ingest data, perform data retrieval and storage actions as described herein. Databases may include, but are not limited to relational databases, hierarchical databases, distributed databases, in-memory databases, flat file databases, XML databases, NoSQL databases, graph databases, and/or a combination thereof.

Server systems 130 may be any server capable of executing computer instructions as described herein. Additionally, server 130 may be communicatively coupled to first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

The network 140 may include a local area network (LAN), a wide area network (WAN), a wireless telecommunications network, and/or any other communication network or combination thereof. The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
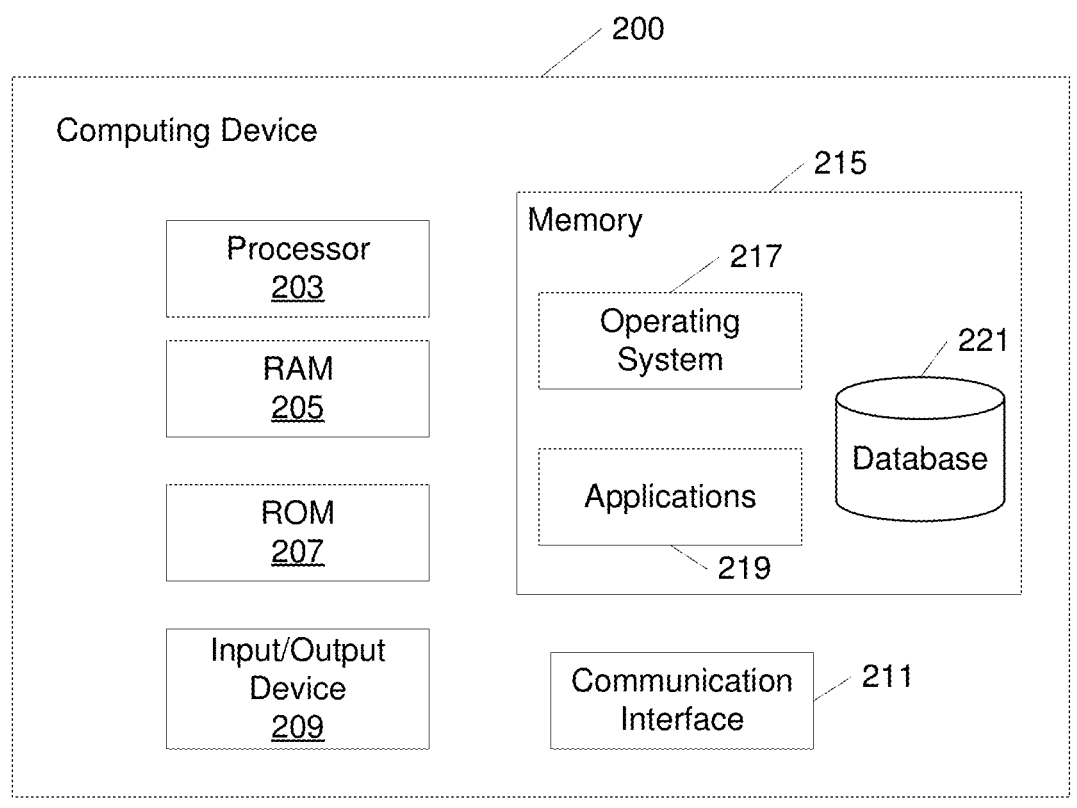
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more speakers for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
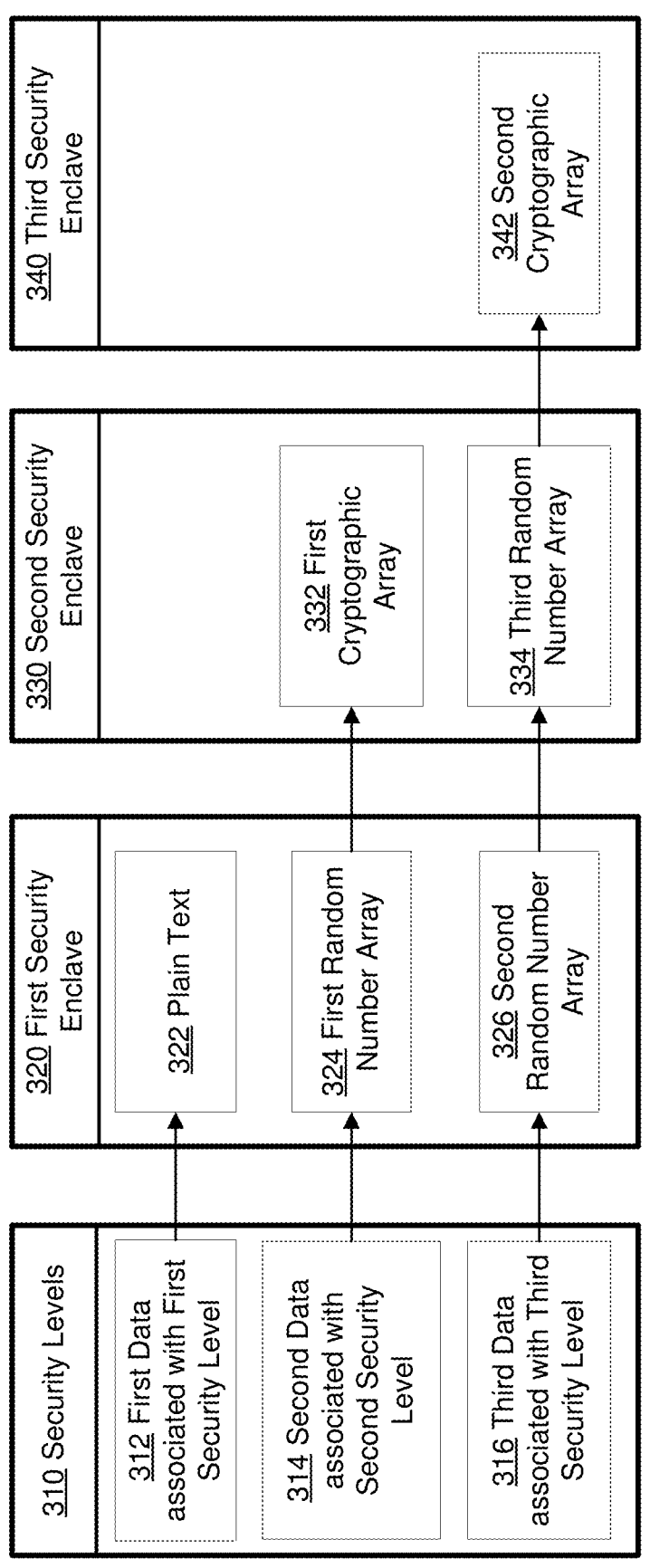
FIG. 3 shows an example of distributing tokenized data into enclaves associated with multi-tiered security levels according to one or more aspects of the disclosure.

A customer may provide sensitive data in order to complete a transaction. Examples of sensitive data may include a customer's credit card number, social security number, credit rating, income, loan history, email, birthdate, or account credentials. Sensitive data could also include health data such as patient medical history, medical diagnosis, treatment, or fitness tracker data. Sensitive data vary in sensitivity and require different levels of security. The system may provide a secure multi-tiered system to ensure that the customer's sensitive data is protected against a cyberattack. The attacker may attempt to obtain the sensitive data field by determining the random number arrays in one security enclave. However, the attacker may be unable to decrypt the sensitive data field without matching all of the random number arrays that have been distributed amongst all of the hashed security enclaves. FIG. 3 shows an example of distributing tokenized data into enclaves associated with multi-tiered security levels according to one or more aspects of the disclosure. Some or all of the steps of process 300 may be performed using one or more computing devices as described herein.

FIG. 3 includes security levels 310, which shows various types of data associated with the various tiers of security levels. For example, a first data that is associated with a first security level 312 shown under security levels 310 may indicate that the associated first data is of low sensitivity and requires a lower level security. A customer's name, gender, phone number, race/ethnicity, or zip code are a few examples of the first data. The appropriate level of sensitivity for data received may be determined in accordance with a predetermined algorithm that sorts and classifies data, predetermined privacy standards, or appropriate data privacy regulations. The appropriate levels of sensitivity may be divided into further levels of sensitivity. The sorting and classifying of the appropriate levels of sensitivity may be predetermined or may be determined in real time using machine learning. Since the first data is of low sensitivity, it may only require a first level of security. The first data may be stored in a first security enclave 320 as plaintext 322. The first security enclave 320 may be located in volatile memory and associated with the first security level, which may provide only a single layer of security to the first data.

Second data associated with a second security level 314 shown under security levels 310 may indicate that the associated second data is of moderate sensitivity and require a level of security that is higher than the first level of security, or in other words, a second security level. A consumer's driver's license, passport number, financial account, credit card number in combination with any required security, or precise location, are a few examples of the second data that may be considered moderately sensitive. Since the second data is of moderate sensitivity, it may require an additional layer of security, or in other words, a second level of security. The appropriate level of sensitivity for data received may be determined by various means such as a predetermined algorithm that sorts and classifies data. The appropriate levels of sensitivity may be divided into further levels of sensitivity. The sorting and classifying of the appropriate levels of sensitivity with the corresponding security levels may be predetermined or may be determined in real time using machine learning. The second data may be stored in both a first security enclave 320 and a second security enclave 330. The second security level may be associated with both the first security enclave 320 and the second security enclave 330. The second security enclave 330 provides a second layer of security for the second data associated with second security level 314. The system may generate random number arrays of equal size to the data field of second data and distribute the random number arrays to the first security enclave 320 and a second security enclave 330. The system may generate a first random number array 324 and distribute it into the first security enclave 320. The system may generate a second array in a second security enclave 330. For example, the second array may be a first cryptographic array 332 corresponding to the first random number array 324. An example of a random number array may be an individually-irreversible token (IIT). The first random number array 324 may be called IIT-1A. The second array may be stored as IIT-1B.

Third data associated with a third security level 316 shown under the category of security levels 310 may indicate that the associated third data is of high sensitivity and require a level of security that is higher than both the first level of security and second level of security, or in other words, a third security level. A combination of personal identifiable information such as social security number, bank account number and credentials, and log-in username and password, are a few examples of the third data that are highly sensitive. Since the third data is of high sensitivity, it may require a third level of security. The appropriate level of sensitivity for data received may be determined by various means such as a predetermined algorithm that sorts and classifies data. The appropriate levels of sensitivity may be divided into further levels of sensitivity. The sorting and classifying of the appropriate levels of sensitivity with the corresponding security levels may be predetermined or may be determined in real time using machine learning. The second data may be stored in both a first security enclave 320 and a second security enclave 330. The second security level may be associated with both the first security enclave 320 and the second security enclave 330. The second security enclave 330 provides a second layer of security for the second data associated with second security level 314. The system may generate random number arrays of equal size to the data field of the third data and distribute the random number arrays to the first security enclave 320, the second security enclave 330, and a third security enclave 340. The system may generate a second random number array 326 and distribute it into the first security enclave 320. The system may generate a third random number array 334 in a second security enclave 330. The system may generate a third array. For example, the third array may be a second cryptographic array 342 corresponding to the second random number array 326. An example of a random number array may be an individually-irreversible token (IIT).

Although FIG. 3 does not depict security levels beyond a third security level associated with three layers of security enclaves, the system may comprise further tiers of security levels and further arbitrary levels of security enclaves.

Figure 4:
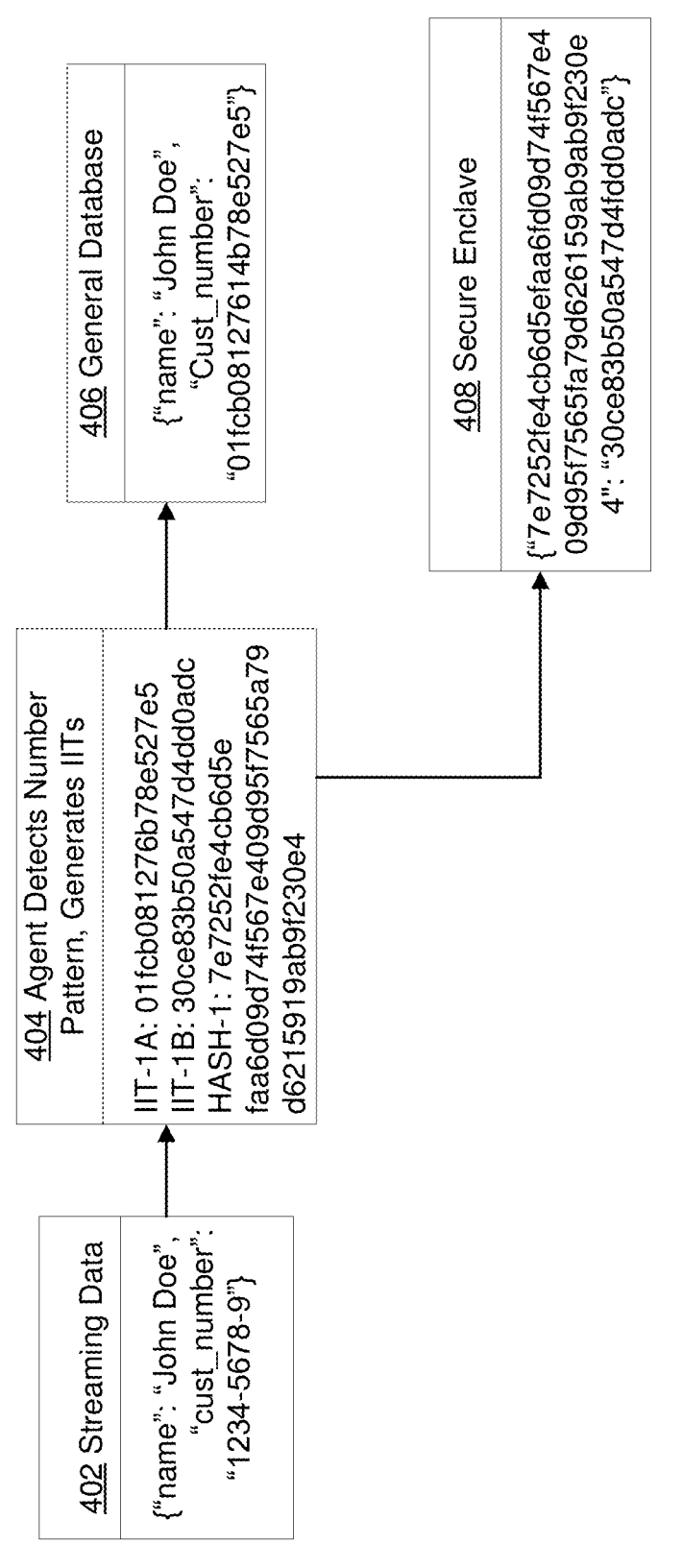
FIG. 4 shows an example of a process for distributing tokenized data into two-tiered enclaves according to one or more aspects of the disclosure.

When data is ingested into a database, automated agents may first identify or detect sensitive data fields by searching for data patterns that correspond to sensitive data fields. Once the automated agent detects the data patterns, the data may be tokenized and stored in various enclaves. FIG. 4 shows an example of a process for distributing tokenized data into two-tiered enclaves according to one or more aspects of the disclosure. Some or all of the steps of process 400 may be performed using one or more computing devices as described herein.

FIG. 4 shows streaming data 402 comprising an example of data received from a customer. For example, the streaming data 402 shows that the customer's name is John Doe and the customer number is "1234-5678-9." In this example, the customer number may be considered sensitive data. At box 404, an automated agent detects the number pattern received from the streaming data 402 and tokenizes the data by generating individually-irreversible tokens (IITs) or random number arrays of the customer number as shown by "IIT-1A: 01fcb081276b78e527e5." The system may generate this IIT-1A equal in size to the data field. The system may alternatively generate a random character array by accounting for every character of the sensitive data such as the dashes of a social security number. The system may perform non-limiting hash algorithms (i.e., SHA-1, SHA-2, NTLM, and LANMAN) to produce a hash value (i.e., salted hash value) of the data field as shown by "HASH-1: 7e7252fc4cb6d5c faa6d09d74f567e409d95f7565a79d6215919ab9f230e4."

The system may then execute a bitwise exclusive-or (XOR) between the questioned data and IIT-1A. The result of this operation may be stored as IIT-1B as shown by "IIT-1B: 30ce83b50a547d4dd0adc." General database 406 now shows the data from streaming data 402 but instead of the actual customer number in plaintext, the customer number is stored as "01fcb08127614b78e527e5." The system has completely overwritten the customer number with the string representation IIT-1A from box 404. Secure enclave 408 is an enclave with a higher level of security than the general database 406. The secure enclave 408 may be associated with the second security level as discussed in FIG. 3. The system may relocate the string representation IIT-1B to the secure enclave 408 and store it in HASH-1, as shown by "7e7252fe4cb6d5efaa6fd09d74f567e409d95f7565fa79d62 6159ab9ab9f230e4": "30ce83b50a547d4fdd0adc." This tokenization process may optionally be performed on IIT-1B to produce IIT-2A, IIT-2B, and HASH-2 for storage in a third, or further arbitrary levels of security enclaves associated with varying levels or tiers of security. The system may distinguish the level of security necessary for the different data under streaming data 402 based on the sensitivity of the data. However, the system may also arbitrarily distribute the tokenized data into multi-tiered enclaves at varying levels or tiers of security.

Figure 5:
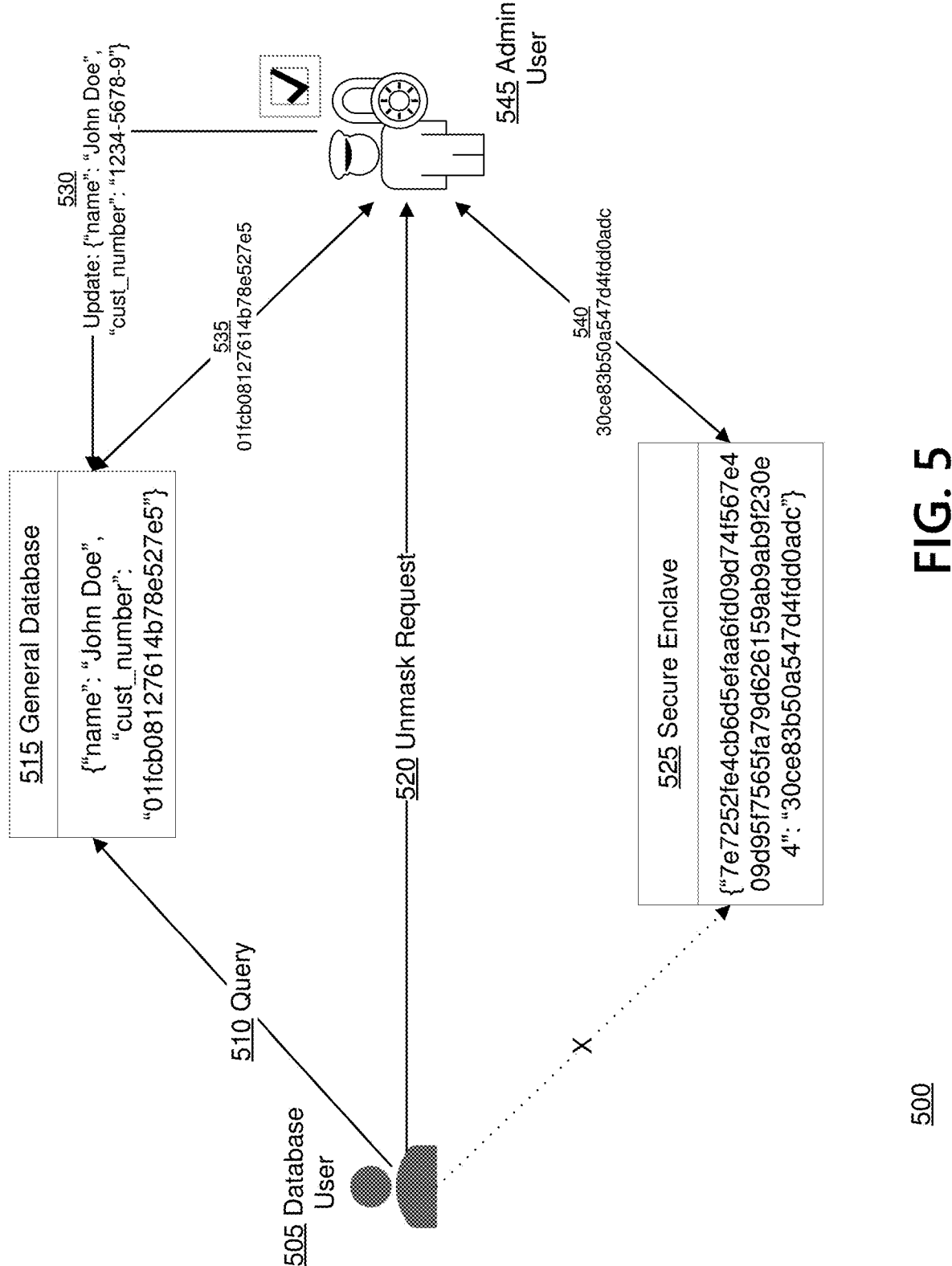
FIG. 5 shows an example of a process for approving an unmask request according to one or more aspects of the disclosure.

After distributing the tokenized sensitive data into its respective enclaves, a user may query the database or enclave associated with a lower security level. FIG. 5 shows an example of a process for approving an unmask request according to one or more aspects of the disclosure. Some or all of the steps of process 500 may be performed using one or more computing devices as described herein.

FIG. 5 shows that the user, such as the database user 505, may query 510 the general database 515, which is a database or enclave associated with a lower security level, to determine if the data field may potentially be sensitive. The potentially sensitive data field may be presented as the string representation IIT-1A in the general database 515, which is a database or enclave associated with a lower security level. The database user 505 may suspect that the sensitive data field is improperly classified in an enclave associated with a higher security level, and may seek to reclassify the sensitive data down to the enclave associated with the lowest appropriate security level. However, the database user 505 may not have the authority or adequate clearance to access the enclave associated with a higher security level, such as secure enclave 525 storing IIT-1B: "30ce83b50a547d4dd0adc" 540.

In order to access the sensitive data or to reclassify the sensitive data down to the appropriate enclave, the database user 505 may provide a request to review, such as an unmask request 520, to an authorized admin user 545. When the authorized admin user 545 receives the unmask request 520 and queries the record, the system hashes the random number array (e.g., IIT-1A: "01fcb08127614b78e527e5" 535) stored in the data field. The authorized admin user 545 may search the enclaves associated with the appropriate security levels for each of the corresponding IITs and hashed values. A hash function generates new values according to a mathematical hashing algorithm, such as a hash value. In some instances, hash values may be used as indices for managing, searching and locating the associated tokenized data in the database. Hash functions in database management systems may increase performance by mapping the keys to the table size. A hash value may then become the index for a specific element such as the tokenized data.

By using the hash values associated with the respective arrays at each enclave, the system may locate the plaintext of the sensitive data in a database or look-up table, for example, to unmask the sensitive data as plaintext. The admin must have the authority to access each of the enclaves in order to successfully decode and unmask the sensitive data. Without access to all of the enclaves, an attacker or user without authorization, may not be able to make sense of the various random number arrays. In some instances, the plaintext of sensitive data may be stored in the first level security level (i.e., first enclave). The plaintext may be indexed by its entry name. In the second security level (i.e., second enclave), this sensitive data may be stored as the random number array (i.e., RN-1) of the plaintext, indexed by its entry name. After encrypting the sensitive data (i.e., XOR the plaintext with RN-1) to generate another random number array (i.e., XOR-1), the XOR-1 may be stored in the second security level and indexed by the hash value of RN-1. In the third security level (i.e., third enclave), a random number array (i.e., RAN-1) of XOR-1 may be generated, stored and indexed by the hash value of RN-1. The sensitive data may be further encrypted (i.e., XOR the XOR-1 with XOR-2) to generate another random number array (i.e., XOR-2). XOR-2 may be indexed by a hash value of RN-2.

The authorized admin user 545 may repeat the process up the respective tiers, levels, or layers for IITs such as those stored in enclaves associated with higher security levels. The authorized admin user 545 may collect each of the corresponding IITs associated with the sensitive data. The system may then perform a variety of different comparative analyses to unmask the sensitive data. For example, the system may execute a binary operation such as a bitwise exclusive-or (XOR) of each of the IITs together to display the original sensitive data. The system may alternatively utilize a combinatorial algorithm, or another binary operation.

The process of decoding, decrypting, or unmasking can be performed in a variety of ways. Using the same example discussed above, an admin user may decode the XOR-2 that was stored in the third enclave by performing a comparative operation between XOR-2 with RN-2 to generate another random number array (i.e., RN-3). This comparative operation may be the same operation that was previously used to generate the random number array (i.e., XOR-1). The system may recognize that RN-3 has the same values as XOR-1, which is indexed by the hash value of RN-1. The system may further perform a comparative operation between RN-1 with RN-3. This operation should provide a result that matches the plaintext of the sensitive data. Thus, the sensitive data that was stored as XOR-2 in the third enclave has been decoded to reveal the data stored as plaintext in the first enclave.

The decoding process may be portrayed in the context of another example, wherein a third data associated with a third security level is received. The third data may be stored as a second random number array in the first security enclave, a third random number array in the second security enclave, and a third array in a third security enclave. The third array may be a second cryptographic array associated with the second random number array and the third random number array. The second cryptographic array may have been generated as a result of a variety of computations. For example, the system may have used a comparative algorithm, a combinatorial algorithm, a binary operation, bit-wise exclusive-or operation, etc. By executing a bit-wise exclusive-or operation between the second random number array and the third random number array, the third array may be generated as a second cryptographic array. In order to decode the third data, the system may generate a fourth array by performing a comparative operation between the third random number array with the third array. This comparison may be the same operation that was previously used to generate the third array. The system may further perform a comparative operation between the second random number array with the fourth array. This operation should provide a result that matches the plaintext of the sensitive data.

The authorized admin user 545 may determine that the data was misclassified. For example, the data may be non-sensitive data that should be classified into a lower-tiered security enclave. However, the data may have been tokenized and improperly classified into a higher-tiered security enclave (e.g., misclassified). When an auditor or admin suspects that the sensitive data field is improperly classified, but does not have access to the higher-tiered security enclave, the auditor or admin may request a review by an auditor with the appropriate access. When an auditor or admin with authority to access the necessary enclave queries the record, the system may hash the random number stored in the field and search the higher-tiered security enclaves for the corresponding random number array. This process may be repeated upwards for the random number arrays stored in higher tiered security enclaves. Once all of the random number arrays have been collected by an auditor or admin with the appropriate permissions, the system may XOR all of the random number arrays together to display the original data in plaintext. After confirming that the data is non-sensitive, the system may make the non-sensitive data accessible to authorized users with appropriate access to the lower-tiered security enclave. Additionally, or alternatively, the system may copy the non-sensitive data to the lower enclave. Additionally, or alternatively, the system may reverse the XOR and update 530 the entry in the lower-tiered security enclave with the plaintext of the non-sensitive data.

In some instances, the data may be associated with a first security level but may have been misclassified into the second security enclave as a random number array. The data should have been classified as plaintext in the first security enclave. The authorized admin user 545 may reclassify the data down to the enclave associated with the lowest appropriate security level, the first security enclave. The database user 505 may alternatively forward the indication of the misclassified sensitive data to an authorized admin user 545. The database user 505 may receive, from the authorized admin user 545, a confirmation that the sensitive data has been misclassified. The system may then overwrite the random number array (string representation IIT-1A) with the plaintext of the customer number in the first security enclave.

In some instances, the data may be data associated with a second security level, but may have been misclassified into the third security enclave as a cryptographic array. The data should have been classified as a random number array in the second security enclave. The authorized admin user 545 may reclassify the data down to the enclave associated with the lowest appropriate security level, the second security enclave. The database user 505 may alternatively forward the indication of the misclassified sensitive data to an authorized admin user 545. The database user 505 may receive, from the authorized admin user 545, a confirmation that the sensitive data has been misclassified. The system may then overwrite the cryptographic array with the random number array in the second security enclave.

In some instances, the data may be associated with a third security level, but may have been misclassified in the second security enclave as a random number array. The data should have been classified as a cryptographic array in the third security enclave. The authorized admin user 545 may reclassify the data up to the enclave associated with the highest appropriate security level, the third security enclave. The database user 505 may alternatively forward the indication of the misclassified sensitive data to an authorized admin user 545. The database user 505 may receive, from the authorized admin user 545, a confirmation that the sensitive data has been misclassified. The system may then generate a cryptographic array of the sensitive data and store it in the third security enclave.

Figure 6:
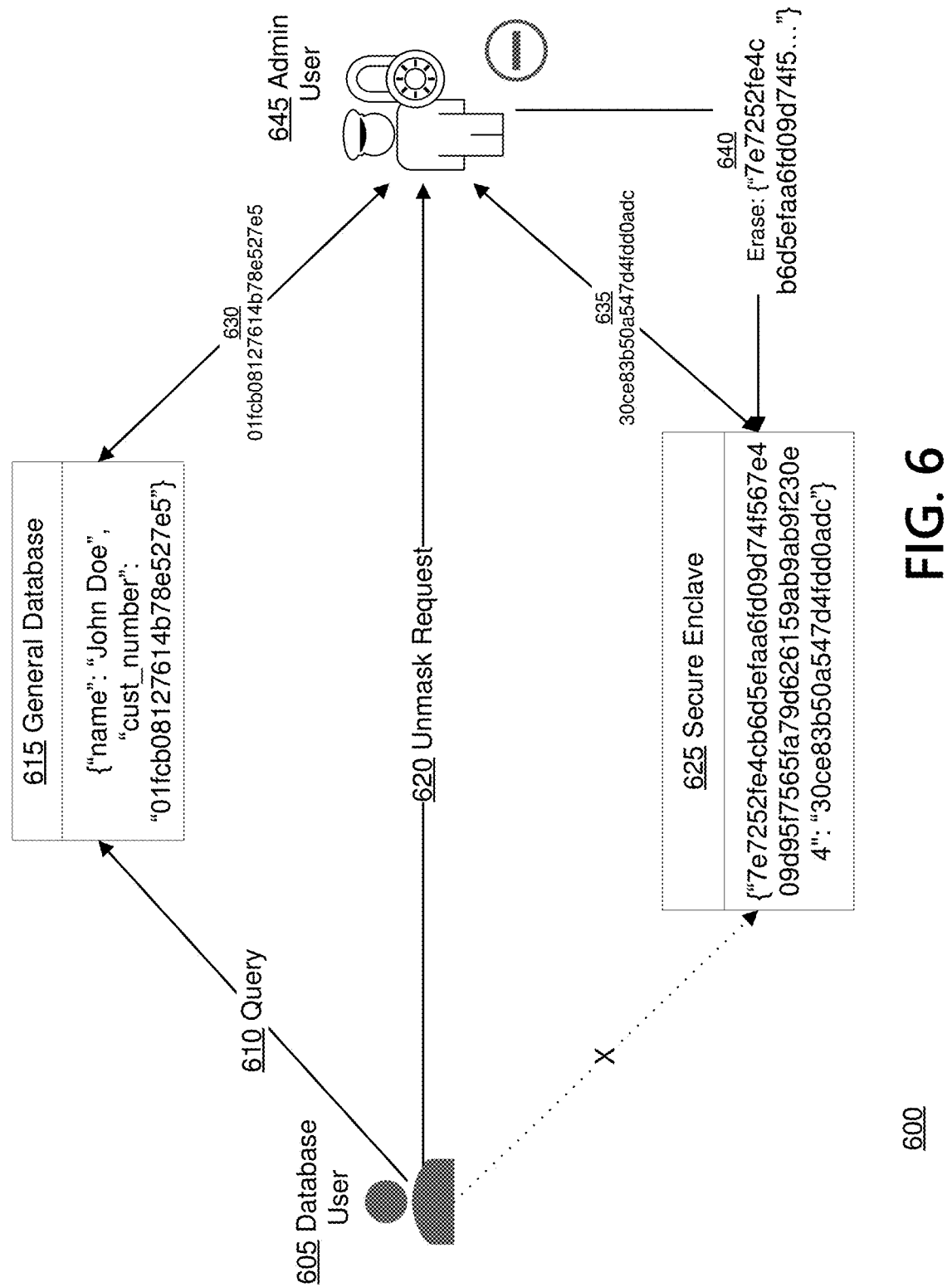
FIG. 6 shows an example of a process for rejecting an unmask request according to one or more aspects of the disclosure.

Not all unmask requests or requests to access varying enclaves will be approved by the authorized admin user. Some requests may be rejected. For example, a request may be rejected due to the fact that the data should not have been recorded at all, which may result in the permanent deletion or redaction of the sensitive data. FIG. 6 shows an example of a process for rejecting an unmask request according to one or more aspects of the disclosure. Some or all of the steps of process 600 may be performed using one or more computing devices as described herein.

FIG. 6 shows that the database user 605 queries 610 the general database 615. In some instances, the database user 605 does not have authority to access or view secure enclave 625. The database user 605 sends an unmask request 620 to the admin user 645. The admin user 645 has authority to view and access both the general database 615 and the secure enclave 625. The admin user 645 may query the record. When the admin user 645 queries the record, the system may hash the string representation IIT-1A or random number array stored in the data field. The admin user 645 may search the enclaves associated with the appropriate security levels for each of the corresponding IITs. The admin user 645 may collect each of the corresponding IITs associated with the sensitive data (e.g., IIT-1A: "01fcb08127614b78e527e5" 630, IIT-1B: "30ce83b50a547d4dd0adc" 635). The admin user 645 may determine that the data is sensitive and was inappropriately ingested (e.g., improperly classified) into the enclave when the sensitive data should not have been recorded at all. This situation may occur when the data retention period may have ended or been revoked. For example, a European citizen may have invoked their "right to be forgotten." The system may mitigate this improper classification by deleting the string representation IITs in each of the enclaves associated with higher security levels. Doing so may permanently remove or erase 640 the sensitive data from the higher security levels, making the sensitive data unrecoverable and redacted.

Figure 7:
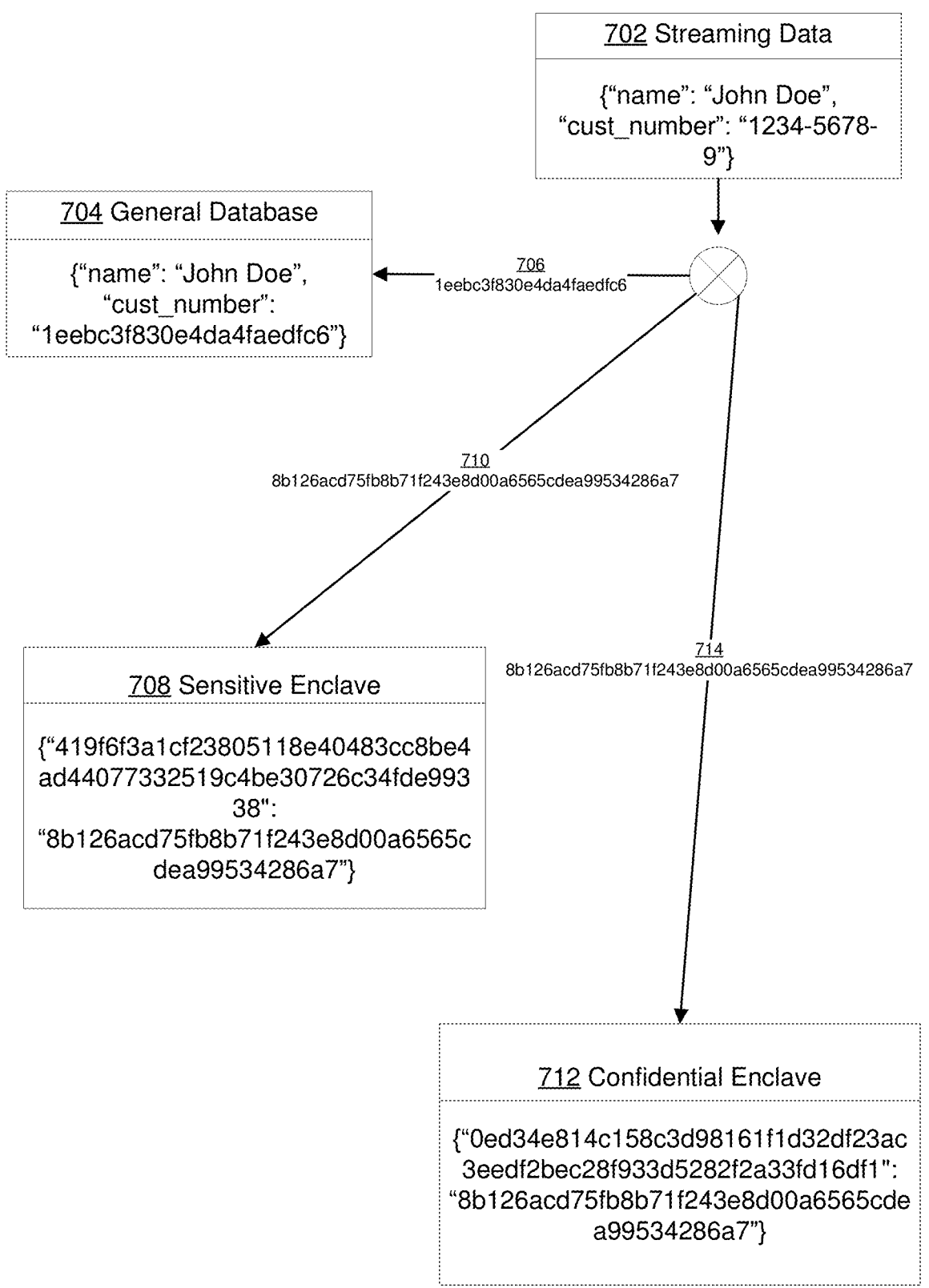
FIG. 7 shows an example of a process for distributing tokenized data into three-tiered enclaves according to one or more aspects of the disclosure.

For the previous three figures, the discussions were in the context of two-tiered enclaves. FIG. 7 shows an example of a process for distributing tokenized data into three-tiered enclaves according to one or more aspects of the disclosure. Some or all of the steps of process 700 may be performed using one or more computing devices as described herein.

FIG. 7 shows an example of streaming data 702 with the name as "John Doe" and the customer number as "1234-5678-9." The customer number is the sensitive data that needs to be secured and protected. The system may have classified this sensitive data with a level of sensitivity that requires a higher level of security. This may be accomplished by generating random number arrays or IITs and hashing the customer number. The system may distribute the IITs accordingly into three different enclaves associated with increasing tiers of security. The enclave associated with the lowest security level may be the general database 704. The enclave associated with the lowest security level may correspond to a first security enclave 320 as shown in FIG. 3. The system may completely overwrite the customer number with a random number array, "1eebc3f830e4da4faedfc6" 706. This may also be called IIT-1A or the string representation of IIT-1A.

The next enclave associated with a higher security level than general database 704 may be sensitive enclave 708. The enclave associated with the higher security level may correspond to a second security enclave 330 as shown in FIG. 3. For example, the system may perform a hash function to produce a hash of the data field, "419f6f3alcf23805118e40483cc8be4ad44077332519c4be3 0726c34fde99338." This may also be called HASH-1. The system may then execute a variety of computations such as a comparative analysis, combinatorial algorithm or a binary operation (i.e., bitwise exclusive-or) between the sensitive data in plaintext and the IIT-1A. The result of this operation may be "8b126acd75fb8b71f243e8d00a6565cdea99534 286a7" 710 and stored in sensitive enclave 708. This may be called IIT-1B or the string representation IIT-1B. The IIT-1B may be indexed by the HASH-1.

The next enclave associated with an even higher security level than the general database 704 and the sensitive enclave 708 may be the confidential enclave 712. The enclave associated with the even higher security level may correspond to a third security enclave 340 as shown in FIG. 3. The system may produce another hash of the data field "0ed34e814c158c3d98161fld32df23ac3eedf2bec28f933d52 82f2a33fd16df1." This may be called HASH-2. The system may then execute a variety of computations such as a comparative analysis, combinatorial algorithm or a binary operation (i.e., bitwise exclusive-or) between another random number array such as an IIT-2A and the IIT-1B, which was previously generated for the sensitive enclave 708. The result of this operation may be stored as, "8b126acd75fb8b71f243e8d00a6565cdea99534286a7" 714. This may be called IIT-2B or the string representation IIT-2B. The IIT-2B may be indexed by the HASH-2. The process may be performed for an arbitrary number of enclaves associated with even higher security levels, depending on the sensitivity level of the sensitive data and its appropriate security level.

Figure 8:
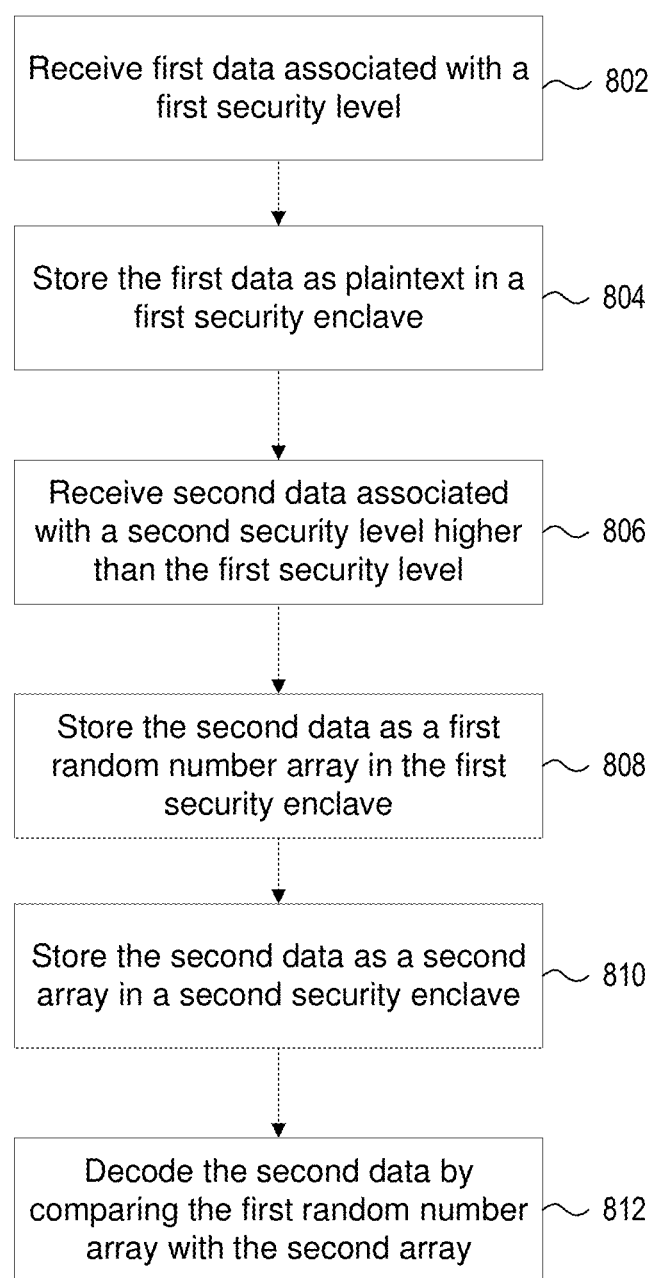
FIG. 8 shows a flow chart of a process for storing and decoding sensitive data according to one or more aspects of the disclosure.

As previously discussed, tokenizing sensitive data was explained in the context of two-tiered enclaves. Two-tiered enclaves may also be referred to as enclaves associated with two security levels, a lower security level and a higher security level. Similarly, FIG. 8 shows a flow chart of a process for storing and decoding sensitive data according to one or more aspects of the disclosure. Some or all of the steps of process 800 may be performed using one or more computing devices as described herein.

FIG. 8 shows at step 802, the system may receive first data associated with a first security level. The first data may be sensitive data with a lower level of sensitivity requiring a lower level of security such as a first security level. For example, sensitive data with a lower degree of sensitivity may be a customer's name, gender, phone number, race/ ethnicity, or zip code. The appropriate level of sensitivity for data received may be determined in a number of different ways. For example, the predetermined algorithm may sort and classify data in accordance with predetermined privacy standards, or appropriate data privacy regulations within a particular industry. The appropriate levels of sensitivity may be divided into further levels of sensitivity. The sorting and classifying of the appropriate levels of sensitivity may be predetermined or may be determined in real time or may be determined contemporaneously or dynamically by various means such as machine learning, artificial neural networks, etc. Since the first data is of relatively low sensitivity, it may only require a first level of security.

At step 804, the system may then store the first data as plaintext in a first security enclave. The first security enclave may be associated with the first security level, which may provide only a single layer of security to the first data.

Moreover, the first security enclave may be stored in various forms of memory such as volatile memory, non-volatile memory, etc. Step 804 may be seen in FIG. 3, wherein the first data associated with a first security level 312 is stored in the first security enclave 320 as plaintext 322. Another instance of a first security enclave may be a general database 406 as shown in FIG. 4.

At step 806, the system may receive second data associated with a second security level higher than the first security level. For example, FIG. 3 shows an instance of second data associated with a second security level 314 shown under security levels 310. This may indicate that the associated second data is of relatively moderate sensitivity and require a level of security that is higher than the first level of security as received in step 802, or in other words, a second security level. For example, sensitive data with relatively moderate sensitivity may be a consumer's driver's license, passport number, financial account, credit card number in combination with any required security, or precise location. Since the second data is of moderate sensitivity, the second data may require an additional layer of security, or in other words, a second level of security. The appropriate level of sensitivity for data received may be determined in a number of different ways. For example, the predetermined algorithm may sort and classify data in accordance with predetermined privacy standards, or appropriate data privacy regulations within a particular industry. The appropriate levels of sensitivity may be divided into further levels of sensitivity. The sorting and classifying of the appropriate levels of sensitivity may be predetermined or may be determined in real time or may be determined contemporaneously or dynamically by various means such as machine learning, artificial neural networks, etc. The second data may be stored in both a first security enclave 320 and a second security enclave 330. The second security level may be associated with both the first security enclave 320 and the second security enclave 330. The second security enclave 330 provides a second layer of security for the second data associated with second security level 314. An auditing admin would need authority to access both the first security enclave 320 and the second security enclave 330 in order to access the second data that was received in step 806. In some instances, the first security enclave may be a general database 406 and the second security enclave may be a secure enclave 408 as shown in FIG. 4.

At step 808, the system may store the second data as a first random number array in the first security enclave. The system may generate random number arrays of equal size to the data field of second data and distribute the random number arrays to the first security enclave 320 and a second security enclave 330. The system may generate a first random number array 324 and distribute it into the first security enclave 320. An example of a random number array may be an individually-irreversible token (IIT). The first random number array 324 may be called IIT-1A. Another instance of step 808 can be seen in FIG. 4 wherein the agent detects the number pattern and generates IITs 404. The first random number array (IIT-1A) is stored in the general database 406.

At step 810, the system may store the second data as a second array in a second security enclave. For example, the second array may be a first cryptographic array 332 corresponding to the first random number array 324 as shown in FIG. 3. An example of a random number array may be an individually-irreversible token (IIT). The second array may be stored as IIT-1B. Another instance of step 810 can be seen in FIG. 4 wherein the agent detects the number pattern and generates IITs 404. The second array (IIT-1B) is stored in secure enclave 408.

At step 812, the system may decode the second data by comparing the first random number array with the second array. For example, a bitwise exclusive-or operation may be executed between the first random number array 324 that was stored at step 808 and the second array that was stored at step 810, which may be the first cryptographic array 332, as shown in FIG. 3. This bitwise exclusive-or operation then allows the sensitive data, such as the second data associated with second security level 314, to be unmasked and shown as plaintext.

The process of decoding, decrypting, or unmasking can be performed in a variety of ways. The decoding process may be portrayed in the context of an example instance, wherein a third data associated with a third security level is received. The third data is stored as a second random number array in the first security enclave, a third random number array in the second security enclave, and a third array in a third security enclave. The third array may be a second cryptographic array associated with the second random number array and the third random number array. The second cryptographic array may have been generated as a result of a variety of computations. For example, the system may have used a comparative algorithm, a combinatorial algorithm, a binary operation, bit-wise exclusive-or operation, etc. By executing a bit-wise exclusive-or operation between the second random number array and the third random number array, the third array may be generated as a second cryptographic array. In order to decode the third data, the system may generate a fourth array by performing a comparative operation between the third random number array with the third array. This comparison may be the same operation that was previously used to generate the third array. The system may further perform a comparative operation between the second random number array with the fourth array. This operation should provide a result that matches the plaintext of the sensitive data.

By using the hash values associated with the respective arrays at each enclave, the system may locate the plaintext of the sensitive data in a database or look-up table, for example, to unmask the sensitive data as plaintext. The admin must have the authority to access each of the enclaves in order to successfully decode and unmask the sensitive data. Without access to all of the enclaves, an attacker or user without authorization, may not be able to make sense of the various random number arrays.

Figure 9:
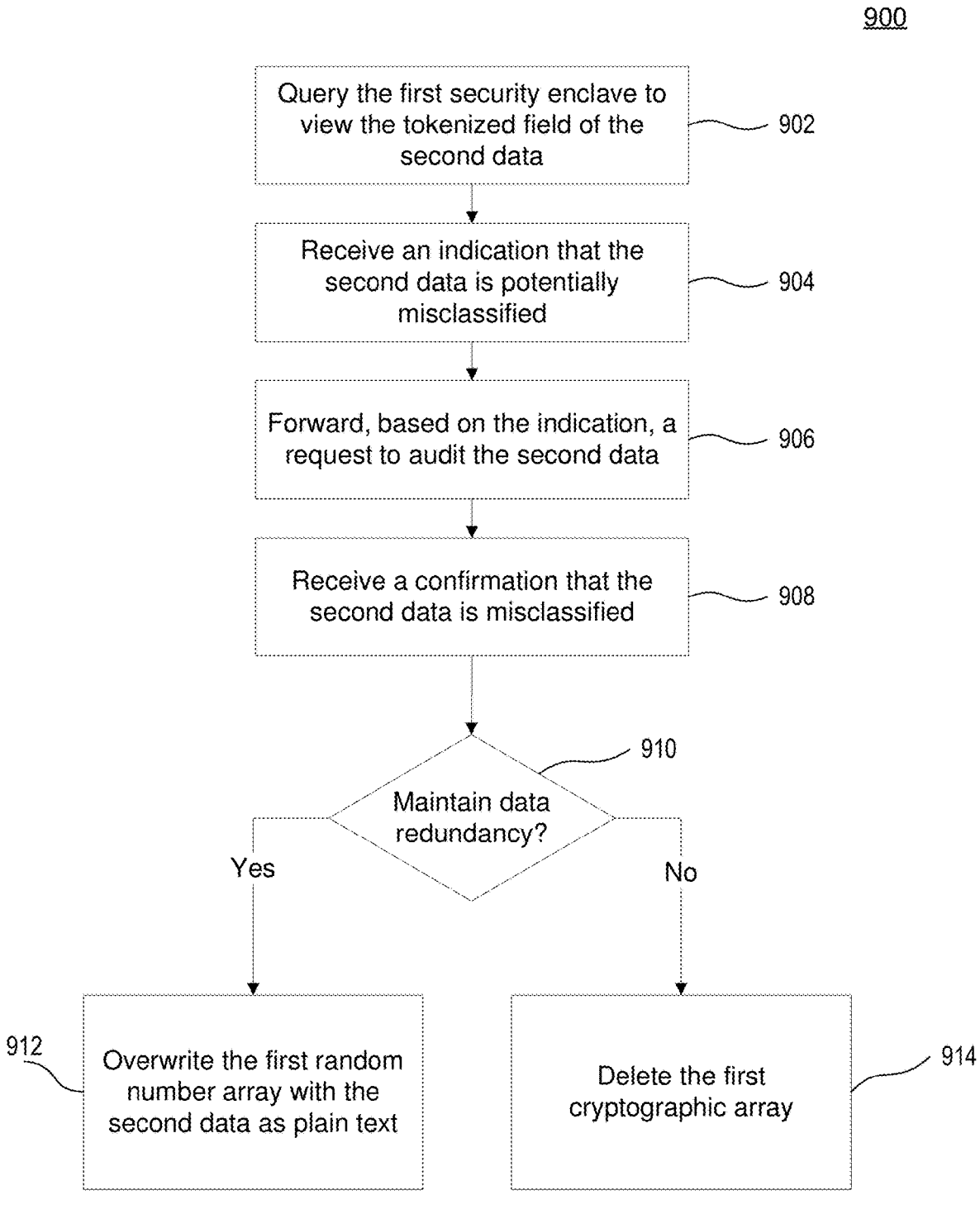
FIG. 9 shows a flow chart of a process for misclassified sensitive data according to one or more aspects of the disclosure.

As discussed above, the authorized user such as the admin user 545 or admin user 645 may approve or reject the request to unmask or access the data. The authorized user may approve the unmask request and provide the data as plaintext. Otherwise, the authorized user may reject the request. Within the context of the data that has been distributed into two-tiered security enclaves, FIG. 9 shows a flow chart of a process for misclassified data according to one or more aspects of the disclosure. Some or all of the steps of process 900 may be performed using one or more computing devices as described herein.

FIG. 9 shows at step 902, the system may query the first security enclave to view the tokenized field of the second data. For example, an analyst (e.g., a database user 605) may not have the authority to view the second data stored in the higher security enclave (e.g., secure enclave 625, second security enclave 330). Instead, the database user may have the authority to access the lowest security enclave (e.g., general database 615, first security enclave 320) associated with the second data. The database user 605 may query the lowest security enclave and locate the tokenized field associated with the data. The database user 605 may query the lowest security enclave for several reasons. For example, the database user 605 may perform routine queries that may have been scheduled in advance. Additionally, or alternatively, the database user 605 may automatically query security enclaves. Additionally, or alternatively, the database user 605 may continuously or periodically query security enclaves. Additionally, or alternatively, the database user 605 may be prompted to query a security enclave by an internal system or an alert associated with data or a security enclave.

At step 904, the system may receive an indication that the second data is potentially misclassified. This indication of potentially misclassified data may mean that the data was properly retained, but over-classified, properly retained and properly classified, or improperly retained and properly classified. This indication of potentially misclassified data may be determined by a variety of means (e.g., machine learning algorithm, pattern matching, automatic scanner). In some instances, the database user 605 may have anticipated that the tokenized field is sensitive data (e.g., Social Security Administration Numbers (SSAN)). However, the database user 605 may determine that the data may be misclassified or receive an indication that the data may be misclassified. Although the database user 605 may not have the authority to unmask and view the sensitive data, the database user 605 may be able to recognize that the data may potentially be misclassified based on, for example, the size or pattern of the array. The system may need to perform an audit to confirm whether the data is actually misclassified or not, and provide a solution according to the confirmation.

At step 906, the system may forward a request, based on the indication in step 904, to audit (e.g., review) the second data. In some instances, the database user 605 may not have the appropriate ability to verify whether the data is misclassified or not because the database user 605 may not have the authority to access the higher security enclave. The database user 605 may forward the audit request to an authorized user with the appropriate authority (e.g., admin user 545, auditor) to access the second security enclave and audit (e.g., review) the potentially misclassified data.

At step 908, the system may receive a confirmation, from the authorized user, that the second data is misclassified. Misclassified data may be data that was properly retained, but over-classified. Additionally, or alternatively, misclassified data may be data that was improperly retained, but properly classified. If the data was not misclassified, then the data may be properly retained and properly classified.

In some instances, the second data may be confirmed to be properly retained, but over-classified. The data may be confirmed to be properly retained because the second data is, in fact, sensitive data and there may not be any policy that prohibits the storage or retention of the data. The second data may be sensitive data and associated with a second security level 345 as shown in FIG. 3, but may have been misclassified into the third security enclave as a cryptographic array. The second data should have been classified as a random number array in the second security enclave (i.e., over-classified). For example, the admin user 645 may reverse the tokenization of the data in the higher security enclave by looking up the associated random number array at the higher security enclave. The admin user 645 may XOR the associated random number array with the random number array in the lower security enclave to retrieve the plain text. The admin user 645 may determine that the data was incorrectly masked. For example, the data may have appeared to look like sensitive data such as a Social Security Administrative Number (SSAN) due to its format (e.g., pattern), but was actually non-sensitive data. This means that the data may have been properly retained, but over-classified. In this case, the admin user 645 may update the original record with plain text such that the data may be viewed as plain text. Additionally, or alternatively, the admin user 645 or the system, may lift the restrictions on that particular IIT at the higher security enclave, such that the lower-level database software can automatically read and unmask the data.

In some instances, the second data may be confirmed to be improperly retained, but properly classified. The admin user 645 may reverse the tokenization of the data in the higher security enclave by looking up the associated random number array at the higher security enclave. The admin user 645 may XOR the associated random number array with the random number array in the lower security enclave to retrieve the plain text. After unmasking, the admin user 645 may determine that the data is sensitive data and classified in its appropriate security enclave. Although the admin user 645 may have determined that the second data is, in fact, sensitive data, the data may have been retained when it should not have been retained. The data may be improperly retained for various reasons. For example, there may be a policy that prohibits the storage or retention of the data. In yet another example, the retention period for the data may have expired. In yet another example, a European citizen may have invoked their "right to be forgotten" regarding their sensitive data. The admin user 645 may mitigate this improper classification by permanently deleting the data from the high-tiered security enclave, resulting in sensitive data that is redacted and unrecoverable.

Additionally, or alternatively, after unmasking, the admin user 645 may determine that the data is sensitive data, but was not classified in its appropriate security enclave. Nevertheless, the data may have been retained when it should not have been retained. The admin user 645 may mitigate this improper classification by permanently deleting the data from the high-tiered security enclave, resulting in sensitive data that is redacted and unrecoverable.

At step 910, the system decides whether to maintain data redundancy or not. If the system decides to maintain data redundancy, the system moves on to step 912. If the system decides not to maintain data redundancy, the system moves on to step 914 instead. A variety of factors may be taken into consideration in order for the system to determine whether or not to maintain data redundancy.

In some instances, the system may choose to maintain data redundancy because the admin user 645 may have determined, in step 908, that the data was properly retained, but over-classified. Additionally, or alternatively, the admin user 645 may have determined in step 908, that the data was properly retained and properly classified. In either scenario, maintaining data redundancy may be appropriate.

In some instances, the system may choose not to maintain data redundancy because the admin user 645 may have determined, in step 908, that the data was improperly retained. Whether or not the data was classified into its appropriate security enclave, the data should not have been retained. This means removing data redundancy may be appropriate.

Additionally, or alternatively, the system may choose to maintain data redundancy in order to maintain alternative data backup methods, provide enhanced data security, faster data access and updates, or improved data reliability. Additionally, or alternatively, the system may choose not to maintain data redundancy in order to avoid possible data inconsistency, increase in data corruption, increase in database size, or increase in cost.

At step 912, the system may overwrite the first random number array with the second data as plain text based on the decision to maintain data redundancy at step 910. Step 912 may be appropriate for misclassified data that may have been properly retained, but over-classified.

In some instances, the system may choose to maintain data redundancy because the admin user 645 may have determined in step 908, that the data was properly retained, but over-classified. The data may be confirmed to be properly retained because the second data is, in fact, sensitive data and there may not be any policy that prohibits the storage or retention of the data. The second data may be sensitive data and associated with a second security level 345 as shown in FIG. 3, but may have been misclassified into the third security enclave as a cryptographic array. The second data should have been classified as a random number array in the second security enclave (i.e., over-classified). For example, the admin user 645 may reverse the tokenization of the data in the higher security enclave by looking up the associated random number array at the higher security enclave. The admin user 645 may XOR the associated random number array with the random number array in the lower security enclave to retrieve the plain text. The admin user 645 may determine that the data was incorrectly masked. For example, the data may have appeared to look like sensitive data such as a Social Security Administrative Number (SSAN) due to its format (e.g., pattern), but was actually non-sensitive data. This means that the data may have been properly retained, but over-classified. In this case, the admin user 645 may update the original record with plain text such that the data may be viewed as plain text. Additionally, or alternatively, the admin user 645 or the system, may lift the restrictions on that particular IIT at the higher security enclave, such that the lower-level database software can automatically read and unmask the data.

In some instances, the data may be first data associated with a first security level 312 and confirmed to be sensitive data that has been properly retained. However, the first data may have been improperly classified (e.g., over-classified) into the second security enclave 330 as a random number array. The data should have been classified as plain text 322 in the first security enclave 320. The authorized admin user 545 may reclassify the data down to the enclave associated with the lowest appropriate security level, the first security enclave 320, and overwrite the random number array (i.e., string representation IIT-1A) with the plain text 322 of the customer number in the first security enclave 320, as shown in FIG. 5 at 535. In some instances, the data may be second data associated with a second security level 314 and confirmed to be sensitive data that has been properly retained. However, the second data may have been improperly classified (e.g., over-classified) into the third security enclave 340 as a cryptographic array. The data should have been classified as a random number array in the second security enclave 330. The authorized admin user 545 may reclassify the data down to the enclave associated with the lowest appropriate security level, the second security enclave and overwrite the cryptographic array with the random number array in the second security enclave.

In some instances, the data may be third data associated with a third security level 316 and confirmed to be sensitive data that has been properly retained. However, the second data, but may have been improperly classified (e.g., under-classified) into the second security enclave 330 as a random number array. The data should have been classified as a cryptographic array 342 in the third security enclave 340. The authorized admin user 545 may reclassify the data up to the highest appropriate security level, the third security enclave. Rather than overwriting, the system may instead tokenize the data and generate a cryptographic array of the sensitive data and store (e.g., record) it in the third security enclave.

Additionally, or alternatively, the admin user 645 may have determined in step 908, that the data was not misclassified. Instead, the admin user 645 may have determined and confirmed that the data may be properly retained and properly classified. In some instances, the admin user 645 may maintain data redundancy at 910. However, at step 912, the admin user 645 may not overwrite a first random number array with the second data as plain text in step 912. Instead, the admin user 645 may do nothing. Since the data is sensitive data, properly retained and properly classified, no additional action may be necessary. The database user 605 who may have initially forwarded the request to audit in step 906 may continue to lack the authority to view or access the data in the higher security enclave. Additionally, or alternatively, the admin user 645 may notify the database user 605 that the database user 605 does not have the authority to view the record (e.g., second security enclave 330 or first cryptographic array 332 of second data).

At step 914, the system may delete the first cryptographic array based on the decision to not maintain data redundancy at step 910. Step 914 may be appropriate for misclassified data that may have been confirmed to be sensitive data and improperly retained. Whether the sensitive data was properly or improperly classified into an appropriate security enclave, the data may be prohibited from being retained. This situation may occur when the policy prohibits storage or retention of the data. Additionally, or alternatively, this situation may occur when the data retention period may have ended or been revoked. For example, a European citizen may have invoked their "right to be forgotten." The system may mitigate the misclassified data by permanently deleting the data from the higher security enclave, resulting in sensitive data that is redacted and unrecoverable.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   receiving first data associated with a first security level;
   storing, based on the first security level, the first data as plaintext in a first security enclave;
   receiving second data associated with a second security level higher than the first security level;
   storing, based on the second security level, the second data as:
     a first random number array in the first security enclave, and
     a second array in a second security enclave, wherein the second array is a first cryptographic array corresponding to the first random number array; and
   decoding the second data by comparing the first random number array with the second array.

2. The computer-implemented method of claim 1, wherein:
   receiving, from a first user with a first security level clearance, an authorization to view the first security enclave; and
   receiving, from a second user with a second security level clearance, the authorization to view the first security enclave and the second security enclave.

3. The computer-implemented method of claim 2, further comprising:
   receiving, from the first user and based on the first random number array, an indication that the second data is misclassified;
   forwarding the indication to the second user;
   receiving, from the second user, a confirmation that the second data is misclassified; and
   overwriting, based on the confirmation and in the first security enclave, the first random number array with the second data as plaintext.

4. The computer-implemented method of claim 1, further comprising:
   receiving third data associated with a third security level higher than the second security level;
   storing, based on the third security level, the third data as:
     a second random number array in the first security enclave,
     a third random number array in the second security enclave, and
     a third array in a third security enclave, wherein the third array is a second cryptographic array associated with the second random number array and the third random number array;

decoding the third data by:

generating a fourth array by comparing the third random number array with the third array; and comparing the second random number array with the fourth array.

5. The computer-implemented method of claim 4, further comprising:

receiving, from a first user with a first security level clearance, an authorization to view the first security enclave;

receiving, from a second user with a second security level clearance, the authorization to view the first security enclave and the second security enclave; and receiving, from a third user with a third security level clearance, the authorization to view the first security enclave, the second security enclave, and the third security enclave.

6. The computer-implemented method of claim 5, further comprising:

receiving, from the first user and based on the second random number array, an indication that the third data is misclassified;

forwarding the indication to the third user;

receiving, from the third user, a confirmation that the third data is misclassified; and overwriting, based on the confirmation and in the first security enclave, the second random number array with the third data as plaintext.

7. The computer-implemented method of claim 5, further comprising:

receiving, from the second user and based on the third random number array, an indication that the third data is misclassified;

forwarding the indication to the third user;

receiving, from the third user, a confirmation that the third data is misclassified; and overwriting, based on the confirmation and in the second security enclave, the third random number array with the third data as plaintext.

8. A non-transitory, machine-readable medium storing instructions that, when executed by one or more processors, cause the one or more processors to perform steps comprising:

receiving first data associated with a first security level;

storing, based on the first security level, the first data as plaintext in a first security enclave;

receiving an authorization to access a second security level, higher than the first security level, wherein the second security level permits access to the first security enclave and a second security enclave;

receiving second data associated with the second security level;

storing, based on the authorization, the second data as:

a first random number array in the first security enclave, and a second array in the second security enclave, wherein the second array is a cryptographic array corresponding to the first random number array; and decoding, based on the authorization, the second data by comparing the first random number array with the second array.

9. The non-transitory, machine-readable medium of claim 8, wherein the instructions, when executed by the one or more processors, further cause the one or more processors to perform the receiving the authorization by:

receiving, from a second user with a second security level clearance, the authorization.

10. The non-transitory, machine-readable medium of claim 9, wherein the instructions, when executed by the one or more processors, further cause the one or more processors to perform steps comprising:

receiving, from a first user and based on the first random number array, an indication that the second data is misclassified;

forwarding the indication to the second user;

receiving, from the second user, a confirmation that the second data is misclassified; and overwriting, based on the confirmation and in the first security enclave, the first random number array with the second data as plaintext.

11. The non-transitory, machine-readable medium of claim 8, wherein the instructions, when executed by the one or more processors, further cause the one or more processors to perform steps comprising:

receiving third data associated with a third security level higher than the second security level;

storing, based on the third security level, the third data as:

a second random number array in the first security enclave, a third random number array in the second security enclave, and a third array in a third security enclave, wherein the third array is a second cryptographic array associated with the second random number array and the third random number array;

decoding the third data by:

generating a fourth array by comparing the third random number array with the third array; and comparing the second random number array with the fourth array.

12. The non-transitory, machine-readable medium of claim 11, wherein the instructions, when executed by the one or more processors, further cause the one or more processors to perform steps comprising:

receiving, from a third user with a third security level clearance, an additional authorization to view the first security enclave, the second security enclave, and the third security enclave.

13. The non-transitory, machine-readable medium of claim 12, wherein the instructions, when executed by the one or more processors, further cause the one or more processors to perform steps comprising:

receiving, based on the second random number array, an indication that the third data is misclassified;

forwarding the indication to the third user;

receiving, from the third user, a confirmation that the third data is misclassified; and overwriting, based on the confirmation and in the first security enclave, the second random number array with the third data as plaintext.

14. The non-transitory, machine-readable medium of claim 12, wherein the instructions, when executed by the one or more processors, further cause the one or more processors to perform steps comprising:

receiving, based on the third random number array, an indication that the third data is misclassified;

forwarding the indication to the third user;

receiving, from the third user, a confirmation that the third data is misclassified; and overwriting, based on the confirmation and in the second security enclave, the third random number array with the third data as plaintext.

15. A computing device configured to perform steps comprising:

receiving first data associated with a first security level;

storing, based on the first security level, the first data as plaintext in a first security enclave;

receiving second data associated with a second security level higher than the first security level;

storing, based on the second security level, the second data as:

a first random number array in the first security enclave, and a second array in a second security enclave, wherein the second array is a first cryptographic array corresponding to the first random number array; and decoding, based on an authorization to access the first security enclave and the second security enclave, the second data by comparing the first random number array with the second array.

16. The computing device of claim 15, wherein the authorization is responsive to a request to access the second security enclave.

17. The computing device of claim 15, wherein the computing device is further configured to perform steps comprising:

receiving, from a second user with a second security level clearance, the authorization.

18. The computing device of claim 15, wherein the computing device is further configured to perform steps comprising:

receiving an indication that the second data is misclassified; and forwarding the indication to a second user with the authorization.

19. The computing device of claim 18, wherein the computing device is further configured to perform steps comprising:

receiving, from the second user, a confirmation that the second data is misclassified; and overwriting, based on the confirmation and in the first security enclave, the first random number array with the second data as plaintext.

20. The computing device of claim 18, wherein the computing device is further configured to perform steps comprising:

receiving, from the second user, a confirmation that the second data is misclassified; and deleting, based on the confirmation and in the first security enclave, the first random number array.

\* \* \* \* \*